United States Patent

Hein

[11] Patent Number: 5,149,069
[45] Date of Patent: Sep. 22, 1992

[54] SPRING SEAT/JOUNCE BUMPER ASSEMBLY

[75] Inventor: Richard D. Hein, Wabash, Ind.

[73] Assignee: GenCorp Inc., Fairlawn, Ohio

[21] Appl. No.: 790,741

[22] Filed: Nov. 8, 1991

[51] Int. Cl.$^5$ .............................................. F16F 1/36
[52] U.S. Cl. ................................. 267/153; 248/634; 267/33; 267/140; 267/292
[58] Field of Search ............... 267/292, 140, 141, 153, 267/33; 248/634

[56] References Cited

U.S. PATENT DOCUMENTS

| | | | |
|---|---|---|---|
| 3,412,990 | 11/1968 | Gladstone | 267/292 X |
| 3,460,786 | 8/1969 | Rivin | 267/153 X |
| 3,756,551 | 9/1973 | Bishop | 367/153 X |
| 4,790,520 | 12/1988 | Tanaka et al. | 267/292 X |

FOREIGN PATENT DOCUMENTS

| | | | |
|---|---|---|---|
| 601205 | 7/1960 | Canada | 267/292 |
| 1017201 | 10/1957 | Fed. Rep. of Germany | 267/153 |
| 218844 | 9/1986 | Japan | 267/153 |
| 2011579 | 7/1979 | United Kingdom | 267/141 |

Primary Examiner—George A. Halvosa

[57] ABSTRACT

A jounce bumper is described as being formed of resilient eleastomeric material. The bumper comprises a cylindrical head protruding from a hollow cylindrical body which terminates at an outstanding annular flange. An annular extension of the body extends from the body in spaced relation around the head to form an annular void around the head. The body extension has a free marginal edge which curves inwardly towards the head and terminates in close proximity to the head to prevent particulate matter from entering the void which is sized to have a volume which is correlated to the displacement of the head when a predetermined load is applied against the head. Voids are placed in the head and body to provide the deflection control characteristics desired. A rigid metal sleeve is encased in the extension of the body to prevent radial displacement of the head beyond filling of the void around the head.

8 Claims, 1 Drawing Sheet

SPRING SEAT/JOUNCE BUMPER ASSEMBLY

BACKGROUND OF THE INVENTION

This invention relates to an automotive deflection control device, especially to a jounce bumper assembly used in conjunction with an automobile suspension system where it is important to provide progressively greater shock resisting characteristics.

U.S. Pat. Nos. 139,862; 1,571,713; 1,872,259; 2,873,993; 3,323,786; and 4,260,127 disclose many differently shaped rubber bumpers, none of which are believed as pertinent as the prior art bumper which is in use today and disclosed and described in connection with FIG. 1 of the drawing.

Briefly stated, the invention is in a spring seat/jounce bumper assembly which essentially comprises a cylindrical, resilient elastomeric load contacting bumper head which protrudes from an integral hollow cylindrical elastomeric body which terminates in an outstanding annular flange. The bumper head is provided with a center void, and surrounding the bumper head is an annular void which, in turn, is surrounded by a rigid cylindrical sleeve which is encased in the elastomeric material. The sleeve acts to restrict lateral or radial expansion of the bumper head as it compresses under load. The annular void is sized in accordance with the displacement of the bumper head.

DESCRIPTION OF THE DRAWING

The following description of the drawing will be better understood by having reference to the accompanying drawing, wherein.

DETAILED DESCRIPTION OF THE DRAWING

Figure 1:
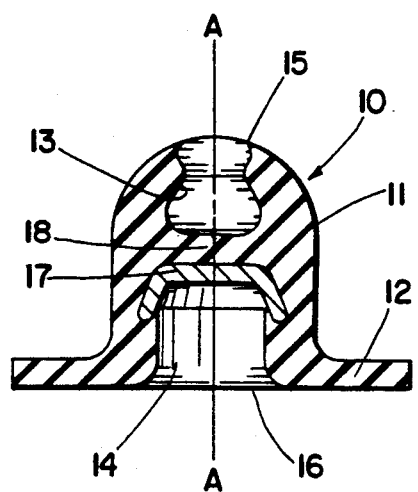
FIG. 1 is a cross-section of a prior art jounce bumper.

With reference to FIG. 1, there is shown a well known bumper 10 which is composed of any suitable resilient elastomeric material, e.g. rubber. The bumper 10 comprises a round-tipped, cylindrical bumper head 11 which protrudes from an integral, outstanding annular flange 12. A pair of back-to-back, axially aligned voids 13, 14 are provided in the bumper head 11 and extend inwardly from the rounded tip 15 and opposing flared end 16. The upper void 13, when the center axis A—A of the bumper 10 is vertically oriented, has an hour glass shaped cross-section, and the lower void 14 has a cylindrical shape. An inverted, flanged circular metal plate 17 is positioned in the layer 18 of elastomeric material between the voids 13, 14 and is exposed in the lower void 14. There is no mechanical lateral or radial restriction provided for the bumper head 11. Moreover, under heavy loading, the bumper head 11 becomes so distorted and compressed as to allow the tire to contract the underside of the wheel well. The invention is designed to overcome this problem.

Figure 2:
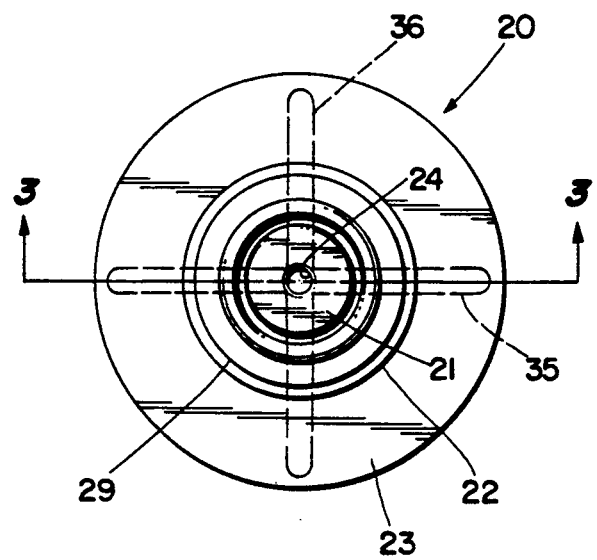
FIG. 2 is a plan view of a jounce bumper which is made in accordance with the invention.
Figure 4:
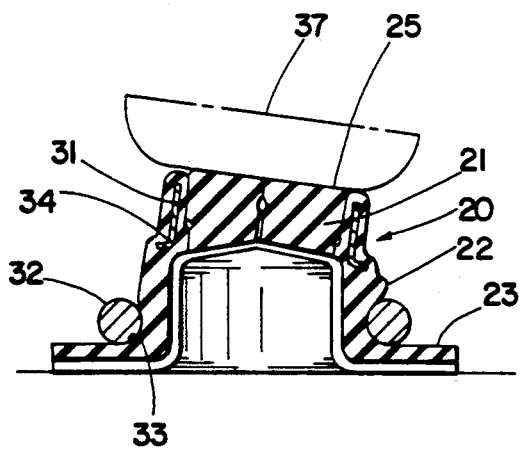
FIG. 4 is a similar section of the bumper in assembled relation with a coil spring and under load.
Figure 3:
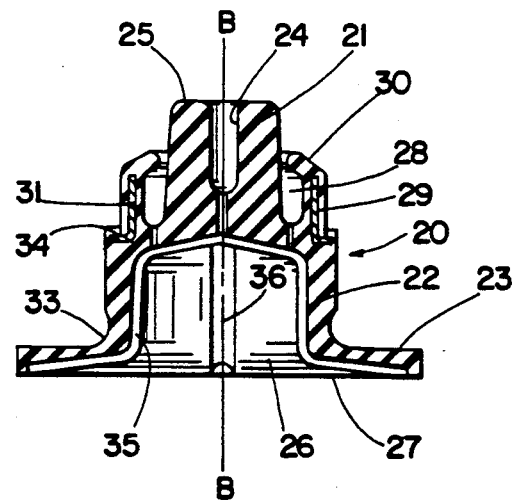
FIG. 3 is a section of the bumper viewed from the line 3—3 of FIG. 2.

With reference to FIGS. 2–4, there is shown a jounce bumper 20 which is, likewise, composed of any suitable resilient elastomeric material, e.g. rubber. The bumper 20, as best seen in FIG. 3, includes a cylindrical, load contacting bumper head 21 which protrudes from a hollow cylindrical body 22 which terminates at an outstanding annular flange 23. A cylindrical void 24 extends axially into the bumper head 21 from the outer, flat, blunted top end 25 of the bumper head 21, when the axis B—B of the bumper 20 is vertically oriented, as will be assumed for purposes of this description. A cylindrical void 26 extends axially inwardly of the bumper body 22 from the opposing, flared, bottom end 27 of the bumper 20. Thus, the upper void 24 and lower void 26 are in axially spaced back-to-back relation. Surrounding the bottom half of the bumper head 21, is an annular void 28 which, in turn, is surrounded by an upstanding, annular extension 29 of the bumper body 22. The extension 29 has an upper free end 30 which curves inwardly towards the bumper head 21 and terminates in close proximity to it.

A rigid, cylindrical, hollow metal sleeve 31 is embedded in the body extension 29 to restrict lateral or radial expansion of the bumper head 21 beyond closure of the third annular void 28 by the bumper head 21, when under heavy load, as seen in FIG. 4 which also shows a metal coil spring 32 bedded in an annular seat 33 which is formed at the outer juncture of the bumper body 22 with the annular flange 23. The metal sleeve 31 has a flared bottom end which forms an outstanding annular flange 34 to help rigidfy the body extension 29.

A pair of cross-wise, intersecting air passageways 35, 36 are provided to allow the escape of air between the bumper 20 and adjacent metal cap (not shown) in the lower void 26 when the bumper 10 is under load from, for example, a contacting cap 37 which is part of the automobile frame or chassis.

The volume of the annular void 28 is designed to correspond to the displacement of the bumper head 21 under maximum loading conditions, after which the bumper head 21 is prevented from further lateral or radial expansion by the surrounding metal sleeve 31. The upper free end 30 of body extension 29 is designed to protect the annular void 28 from particulate matter which might adversely effect the deformation of the bumper head 21 under load. The top center void 24 acts to soften the initial load characteristics of the bumper 20, and provide a smooth, gradual transition between the initial and maximum load dampening characteristics of the bumper 20.

Thus, there has been described an improved jounce bumper assembly, wherein the axial movement of the bumper, in response to a heavy load, is restricted by restricting lateral or radial expansion of the bumper to bring the maximum load dampening characteristics of the bumper into play. The bumper head of this bumper is given space to expand radially by the provision of a surrounding annular void whose volume is correlated to a predetermined displacement of the bumper head.

I claim:

1. A jounce bumper, comprising:
   (a) a generally cylindrical, resilient, elastomeric head with a centrally disposed void, protruding from an integral, hollow, cylindrical elastomeric body which terminates in axially spaced relation from the head at an outstanding integral elastomeric annular flange;
   (b) an integral, annular elastomeric extension of the body extending from the body and flange in surrounding, spaced relation around the head and forming an annular void around the head, the extension having a free outer end which curves inwardly towards the head and terminates in proximity to the head in spaced axial relation from a free outer end of the head opposite the annular flange, the volume of the annular void being in correlated relation to the displacement of the head under a predetermined load; and (c) a rigid, hollow, cylindrical sleeve encased in the extension of the body and designed to restrict radial expansion of the head beyond filling of the annular void.

2. The bumper of claim 1, which includes a curved, annular elastomeric seat for a coil spring at the junction of the body and flange.

3. The bumper of claim 1, wherein the free outer end of the head is generally flat, and the centrally disposed void in the head is generally cylindrical and extends axially inwardly of the head from the flat end thereof, the void terminating in spaced axial relation from a cylindrical center void formed within the cylindrical walls of the body.

4. The bumper of claim 3, which includes a plurality of air passageways formed in the surface of the body and flange facing the void between them.

5. The bumper of claim 1, wherein the elastomeric material is rubber.

6. A jounce bumper, comprising:

(a) a generally cylindrical, resilient, elastomeric head extending from an axially aligned, integral, hollow, generally cylindrical body which terminates at an integral, annular elastomeric flange which is coaxially aligned with the head and body and which is axially spaced from the head, the flange extending radially outwardly beyond the body, the head and body having a pair of axially aligned and spaced voids, the head having a flat, free outer end from which one of the voids extends centrally into the head, the other of the pair of voids, being cylindrical and defined by the cylindrical walls of the body and flange;

(b) an integral, annular elastomeric extension of the body extending from the body and flange in surrounding spaced relation around the head and forming a third annular void around the head, the extension having a free outer end which is in spaced relation from the body and which curves inwardly towards the head and terminates in proximity to the head in spaced axial relation form the outer flat end of the head, the volume of the third annular void being correlated to the displacement of the head under a predetermined load;

(c) a rigid, hollow, cylindrical, metal sleeve encased in the extension of the body to restrict radial expansion of the head beyond filling of the third annular void, the sleeve having at it annular marginal edge closest the body and flange, an integral annular flange which extends radially outwardly from the third annular void; and (d) an annular seat for a metal coil spring formed in the elastomeric material at the juncture of the body and integral annular flange, the seat being designed to accommodate the coil spring as it compresses the body radially inwardly into the void therein.

7. The bumper of claim 6, wherein the elastomeric material is rubber.

8. The bumper of claim 7, which includes a plurality of air passageways formed in the surface of at least the body confronting the void in the body.

* * * * *